United States Patent Office 3,356,756
Patented Dec. 5, 1967

3,356,756
POLYMERIZATION PROCESS AND COBALT OXIDE ON CARBON CATALYST THEREFOR
Robert G. Schultz, Vinita Park, James M. Schuck, Webster Groves, and Morris R. Ort, St. Louis, Mo., assignors to Monsanto Company, St. Louis, Mo., a corporation of Delaware
No Drawing. Filed Sept. 23, 1963, Ser. No. 310,884
13 Claims. (Cl. 260—683.15)

The present invention relates to the polymerization of polymerizable olefin hydrocarbons. More particularly, the present invention relates to an improved method for the preparation of catalysts useful in the polymerization of polymerizable olefin hydrocarbons.

Copending applications Ser. No. 229,192, filed Oct. 8, 1962 and now abandoned, and Ser. No. 294,750, filed July 12, 1963, and issued as U.S. Patent 3,317,628 on May 2, 1967, have disclosed and claimed a polymerization catalyst, a method for preparation of said catalyst, and a process for using said catalyst, which catalyst comprises cobalt oxide on an activated carbon support prepared by treating the activated carbon with ammonia or ammonium hydroxide, impregnating the activated carbon with a cobalt salt and thereafter again treating the impregnated activated carbon with ammonia or ammonium hydroxide. Many of the cobalt salts which would be useful for impregnation in the preparation of this catalyst are very difficultly soluble in the more common solvents and in particular aqueous solutions. Further the process of the above copending applications necessitates two separate ammoniation treatments which, of course, involves additional time and expense.

It is an object of the present invention to provide an improved process for the polymerization of polymerizable olefin hydrocarbons. Another object of the present invention is to provide an improved catalyst composition useful in the polymerization of polymerizable olefin hydrocarbons. Still another object of the present invention is to provide a method for preparing improved catalyst compositions useful in the polymerization of polymerizable olefin hydrocarbons. A particular object of the present invention is to provide an improved polymerization catalyst comprised of cobalt oxide on carbon. Another particular object of the present invention is to provide a method for preparing an improved cobalt oxide on carbon catalyst. Yet another particular object of the present invention is to provide a process for the polymerization of olefin hydrocarbons in the presence of an improved cobalt oxide on carbon catalyst. Additional objects will become apparent from the following description of the invention herein disclosed.

In fulfillment of these and other objects, it has been found that relatively high conversions of polymerizable olefin monomer to polymer are obtained by contacting polymerizable olefins with a cobalt oxide on carbon catalyst prepared by impregnating an ammoniated activated carbon support with a cobalt salt dissolved in ammonium hydroxide. Several very significant advantages result from the present invention. As noted above, copending applications Ser. No. 229,192, filed Oct. 8, 1962, and Ser. No. 294,750, filed July 12, 1963, disclose and claim impregnation of an ammoniated activated carbon with a cobalt salt followed by treatment with ammonia or ammonium hydroxide, hereinafter referred to as ammoniation. The present invention alleviates the need for the treatment of the cobalt salt impregnated carbon with ammonia or ammonium hydroxide by combining this ammoniation treatment with impregnation in a single step. Quite unexpectedly substantially improved conversions have been found to result from this concurrent ammoniation and impregnation as compared to the impregnation followed by ammoniation. In addition, the use of ammonium hydroxide as a dissolving medium for the cobalt salts allows the use of many cobalt salts heretofore less preferred because of slight or no solubility in water. For example, cobalt carbonate is considerably more soluble in ammonium hydroxide than in water.

"Ammoniated activated carbon," as used herein, refers to an activated carbon which has been treated with ammonia or ammonium hydroxide in accordance with the teachings and claims of the above referred to copending applications and as is hereinafter taught.

To further describe as well as to illustrate the present invention, the following exemplification of its efficacy is presented. This example is in no manner to be construed as limiting the present invention.

EXAMPLE

This example illustrates the preparation of three catalysts in accordance with the present invention and the use of said catalysts in a polymerization of polymerizable olefins. For comparative purposes, the description of the preparation and use of a catalyst prepared in accordance with copending applications Ser. No. 229,192, filed Oct. 8, 1962, and Ser. No. 294,750, filed July 12, 1963, is also given below. The first three catalysts prepared in accordance with the present invention are designated Catalyst A, B, and C, with the catalyst of the copending applications being designated Catalyst D.

Catalyst A

This catalyst was prepared as follows: To 100 grams of a commercial grade (BPL) activated carbon was added approximately 175 ml. of concentrated ammonium hydroxide. All of the ammonium hydroxide was absorbed. The ammonium hydroxide treated activated carbon was dried by heating at 130° C. for 12 hours. To approximately 20 grams of the ammoniated activated carbon so obtained was added a solution of 10 grams of cobalt acetate tetrahydrate in 40 ml. of concentrated ammonium hydroxide assaying approximately 28 percent ammonia. The concurrent ammoniation-impregnation was carried out at room temperature (70 to 75° F.). The excess liquid was evaporated on a hot plate and the ammoniated-impregnated carbon was then dried at low heat, approximately 125° C. for 16 hours. The catalyst so prepared was activated by heating in a nitrogen stream at 35 mm. pressure at approximately 275° C. Approximately 13 percent cobalt, as an oxide, was present in the finished catalyst.

Catalyst B

This catalyst was prepared in the same manner as described above with the exception that the 20 grams of ammoniated activated carbon was admixed with a solution of 6 grams of cobalt formate in 40 ml. of concentrated ammonium hydroxide. This catalyst contained 13 percent by weight cobalt as an oxide.

Catalyst C

This catalyst was prepared in the same manner as that of Catalyst A, with the exception that the 20 grams of ammoniated activated carbon was admixed with 4.8 grams of cobalt carbonate in 100 ml. of concentrated ammonium hydroxide. This catalyst contained 13 percent by weight cobalt, as an oxide.

Catalyst D

This catalyst was prepared by impregnating approximately 50 grams of an ammoniated activated carbon with a solution of 25 grams of cobalt acetate tetrahydrate in 70 ml. of demineralized water. The cobalt salt impregnated carbon was then dried in the vacuum oven at 125° C. for 16 hours and then immersed in approximately 75 ml. of concentrated ammonium hydroxide. The ammonium hydroxide treated cobalt salt impregnated activated carbon was then dried for approximately 2 hours at 130° C. and then activated as described for Catalyst A. This catalyst contained 13 percent by weight of cobalt, as an oxide.

To demonstrate the unexpected results of the present invention four separate polymerization runs were carried out, one with each of the catalysts above described, using 99.9 percent pure propylene as the polymerizable olefin in each run. Each of the four runs was carried out as follows: In a 300 ml. rocking type bomb reactor, there was placed approximately 2 to 3 grams of catalyst and 10 ml. of heptane (optional). Approximately 100 grams of propylene was then fed into the reactor. The reactor was then closed and placed in a rocker agitator and maintained for about 5 hours at a temperature of approximately 25° C. until reaction was complete. The pressure within the closed reactor was autogenous. The catalyst and polymer product were then separated. The percent conversion obtained with each of the catalyst is given in the following table:

|  | Catalyst | | | |
| --- | --- | --- | --- | --- |
|  | A | B | C | D |
| Conversion, percent | 74.8 | 76 | 85.4 | 8.8 |

The above example clearly demonstrates the unexpected and very significant improvement which may be obtained through the use of the present invention.

The base supports useful in the catalysts of the present invention are activated carbons. These activated carbons may be any porous carbon known to be useful for catalyst preparation. The activated carbons generally have surface areas of about 200 to 2000 square meters per gram, preferably 300 to 1500 square meters per gram, and may be in the form of compact masses, granulars, chips, powders, etc. These include coconut charcoal, wood charcoal, coke derived from coal, soft bone charcoal, hard bone charcoal, and the like. The activated carbon may be obtained from animal, vegetable or petroleum sources and may include such commercial materials as Pittsburgh "BPL," "CAL," "OL," and "SGL" produced by Pittsburgh Coke and Chemical Co., Girdler "G-32-C," and "G-32-E" produced by Chemical Products Division, Chemetron Corp., and Barnebey-Cheney Company's "EE-1" and "E-H-1."

The activated carbons used at catalyst supports in the present invention may be either washed or unwashed. If washed, a preferred method of washing comprising treating the carbon with an aqueous nitric acid. In using this preferred washing agent it is generally preferred to use approximately 600 to 1000 mls. of nitric acid for 500 mls. of carbon. Though the nitric acid may be virtually any concentration, it is preferred that it be of a concentration of about 10 to 30% in water. The carbon will generally be treated with nitric acid for from 2 to 10 minutes with 3 to 5 minutes generally being sufficient. After the acid washing, the carbon may be washed with water and if desired, dried. Generally the carbon is water washed until the wash water is substantially neutral (pH 5.0–7.0).

The activated carbon, after completion of the acid washing, if used, is ammoniated. The term "ammoniated" as well as the terms "ammoniate," "ammoniation," etc. refer to the treatment of the catalyst and, as used in this paragraph, to the treatment of the activated carbon with ammonia gas, liquid ammonia under pressure, ammonium hydroxide or these materials mixed with inert diluents at subatmospheric, atmospheric or superatmospheric pressures at temperatures ranging from about −30° C. to about 400° C. In ammoniating activated carbon with ammonia as a gas, generally it will be passed into contact with the activated carbon for 1 to 24 hours at temperatures ranging from 200 to 400° C. If ammonium hydroxide or liquid ammonia is used as the ammoniating agent an amount sufficient to allow complete adsorption into the activated carbon is preferred though greater or lesser amounts may be used. With ammonium hydroxide, concentrations ranging from concentrated ammonium hydroxide down to dilute solutions may be used. Generally, solutions of 15 to 30 percent by weight concentration are preferred. If the carbon is treated with ammonium hydroxide, it is generally necessary to subsequently dry the treated activated carbon. Drying is carried out by heating at temperatures ranging from 100 to 200° C. from 2 to 24 hours, with temperatures of 120 to 150° C. being preferred.

The cobalt salts useful in the present invention are those decomposible to an oxide. Several non-limiting examples of such cobalt salts include cobalt carboxylates such as cobalt acetate, cobalt formate, cobalt propanoate, cobalt butanoate, cobalt pentanoate, cobalt hexanoate, cobalt carbonate, cobalt oxalate, cobalt citrate and the like. The present invention is most useful with cobalt carboxylates of the above described type and such difficultly water soluble cobalt salts as cobalt carbonate. The preferred cobalt salts are cobalt acetate, cobalt formate, cobalt propanoate and cobalt carbonate.

In the practice of the present invention, it is preferred that the ammonium hydroxide used as solvent for the cobalt salt be a concentrated ammonium hydroxide. However, the ammonium hydroxide may be in a dilute aqueous solution. The amount of ammonium hydroxide used will vary depending upon the cobalt salt selected. Generally the amount of ammonium hydroxide will be enough to completely dissolve the cobalt salt, though either greater or lesser amounts may be used. The amount of ammonium hydroxide-cobalt salt solution should be sufficient to at least completely moisten the activated carbon support in the preferred practice of the present invention. Generally, the concurrent ammoniation-impregnation is carried out at ambient temperature (65–75° F.) through both higher and lower temperatures may be used if desired.

After completion of the concurrent ammoniation-impregnation step, the catalyst generally is dried prior to activation. Drying usually is from 1 to 24 hours at 100 to 200° C. Preferably, however, the catalyst is dried prior to activation at 120 to 150° C. for 5 to 24 hours.

Activation of the catalyst mass for use as a polymerization catalyst will generally be carried out by heating the catalyst to temperatures above approximately 200° C., but not in excess of about 550° C. The preferred activation temperatures are within the range of approximately 200° C. to 300° C. if the feeds are predominantly terminally unsaturated olefins and within the range of 400 to 575° C. if the feeds are predominantly internally unsaturated olefins. Activation of the catalyst composition is preferably conducted in the presence of an inert gas such as nitrogen, helium, methane, propane, carbon dioxide, or in a vacuum atmosphere. The catalyst may also be activated in the presence of air until the desired temperature is reached and then the air flushed from the catalyst and replaced with an inert gas for a short time period lasting until the termination of the activation treatment. With the above conditions, activation may generally be accomplished within 0.5 to 10 hours. Preferably, the activation time will range from 2 to 5 hours. It is, of course, within the scope of the present invention to combine the drying step which follows the concurrent ammoniation-impregnation treatment of the catalyst with the activation step just described. However, the catalyst should at least be partially dried prior to activation to alleviate the possibility of explosive decomposition at activation temperatures.

It is preferred that the finished activated catalyst not be contacted with air. If, however, the catalyst is exposed to air in an amount sufficient to cause any deactivation, the catalyst may be readily reactivated by the above described method.

The amount of cobalt present in the catalyst of the present invention may range from approximately 0.5 to 30 percent by weight, calculated as its oxide, of the catalyst. It is preferred, however, that the amount of cobalt be from 5 to 25 percent by weight, calculated as its oxide, of the total catalyst.

The polymerization process of this invention is operated at temperatures ranging from approximately −10 to 200° C., but preferably at temperatures ranging from 10 to 85° C. The pressures at which the present invention is operable may range from atmospheric to 2500 p.s.i.g. It is preferred, however, that pressures of from 50 to 1000 p.s.i.g. be used. The space velocity of the reactants in the present process, if operated as a continuous process, may range from 0.1 to 50 parts by weight of feed per part by weight of catalyst per hour, but preferably from 1.0 to 20.0 parts by weight of feed per part by weight of catalyst per hour. If operated as a batch process, residence times of 1 to 24 hours are most often used, with times of 2 to 5 hours preferred.

Virtually any polymerizable olefin may be polymerized according to the present invention. Generally, such olefins may contain from 2 to 20 carbon atoms and are preferably mono-olefin hydrocarbons. The preferred use of the present invention is in the polymerization of mono-olefin hydrocarbons containing from 2 to 10 carbon atoms. Non-limiting examples of such hydrocarbons are ethylene, propylene, butylene, pentylene, iso-pentylenes, hexenes, iso-hexenes and the like. Preferably, these mono-olefin hydrocarbons are those that are terminally unsaturated. The present invention is most useful for the polymerization of mono-olefin hydrocarbons of 2 to 4 carbon atoms, i.e., ethylene, propylene, terminally unsaturated butylene and mixtures thereof. The polymerizable olefin hydrocarbon feed to the present invention need not be a pure feed stream, but will generally contain no less than 20 mol percent polymerizable olefins. This limitation is primarily one of commercial practicality, however, rather than operability. Impurities which may be tolerated in the feed to the present process may include saturated hydrocarbons such as n- and iso-paraffins and the like. Di-olefins, tri-olefins and acetylenes are to be avoided in the feed since such unsaturated compounds tend to poison the present catalyst.

The type of reaction equipment used in the process of the present invention is not critical. Any conventional polymerization equipment may be used. The polymerization process may be operated as a batch operation or as a continuous or semicontinuous flow system. The catalyst and polymerizable olefin hydrocarbons may be contacted in a counter-current, cross-current or co-current flow. It is only important that polymerization equipment and the arrangement of apparatus be consistent with good engineering principles.

What is claimed is:

1. A process for the polymerization of polymerizable olefin hydrocarbons which comprises contacting polymerizable olefin hydrocarbons with a catalyst consisting of cobalt oxide supported on activated carbon, said catalyst prepared by impregnating an ammoniated activated carbon support with a cobalt salt dissolved in ammonium hydroxide, said cobalt salt being decomposible to a cobalt oxide and being selected from the group consisting of cobalt carboxylate and cobalt carbonate, drying the resulting impregnated activated carbon support, and activating said impregnated activated carbon support by heating in an inert atmosphere at temperatures of from 200° C. to 550° C.

2. The process of claim 1 wherein the cobalt salt is a cobalt carboxylate.

3. The process of claim 1 wherein the cobalt salt is cobalt carbonate.

4. The process of claim 1 wherein the ammonium hydroxide is a concentrated ammonium hydroxide.

5. The process of claim 1 wherein the amount of ammonium hydroxide is sufficient to completely dissolve the cobalt salt.

6. The process of claim 1 wherein the impregnation of the ammoniated activated carbon catalyst is at ambient temperatures.

7. The process of claim 1 wherein the polymerizable olefin hydrocarbons are mono-olefins of 2 to 10 carbon atoms.

8. A method for the preparation of a catalyst consisting of cobalt oxide on carbon comprising impregnating an ammoniated activated carbon support with a cobalt salt dissolved in ammonium hydroxide, said cobalt salt being decomposible to cobalt oxide and being selected from the group consisting of cobalt carboxylates and cobalt carbonate, drying the resulting impregnated activated carbon support, and activating said impregnated activated carbon support by heating in an inert atmosphere at a temperature of from 200° C. to 550° C.

9. The method of claim 8 wherein the cobalt salt is a cobalt carboxylate.

10. The method of claim 8 wherein the cobalt salt is cobalt carbonate.

11. The method of claim 8 wherein the ammonium hydroxide is a concentrated ammonium hydroxide.

12. The method of claim 8 wherein the amount of ammonium hydroxide is sufficient to completely dissolve the cobalt salt.

13. The method of claim 8 wherein the impregnation of the ammoniated activated carbon catalyst is at ambient temperatures.

References Cited

UNITED STATES PATENTS

| 2,332,276 | 10/1943 | Stahly | 260—683.15 |
| 2,381,198 | 8/1945 | Bailey et al. | 260—683.15 |
| 2,599,249 | 6/1952 | Friedman | 260—683.15 X |
| 2,983,691 | 5/1961 | Richardson | 252—465 X |

PAUL M. COUGHLAN, Jr., *Primary Examiner.*

DELBERT E. GANTZ, *Examiner.*

R. H. SHUBERT, G. J. CRASANAKIS,
*Assistant Examiners.*